(No Model.)

C. W. VAN HOUTEN.
WHEEL TIRE.

No. 501,386. Patented July 11, 1893.

Witnesses:
Hamilton D. Turner.
Alex. Barkoff

Inventor:
Charles W. Van Houten
by his Attorneys
Howson & Howson

UNITED STATES PATENT OFFICE.

CHARLES W. VAN HOUTEN, OF PHILADELPHIA, PENNSYLVANIA.

WHEEL-TIRE.

SPECIFICATION forming part of Letters Patent No. 501,386, dated July 11, 1893.

Application filed August 28, 1891. Serial No. 403,969. (No model.)

*To all whom it may concern:*

Be it known that I, CHARLES W. VAN HOUTEN, a citizen of the United States, and a resident of Philadelphia, Pennsylvania, have invented certain Improvements in Wheel-Tires, of which the following is a specification.

The object of my invention is to provide a tire for bicycles or other wheels that will have all the advantages of both a cushion and a pneumatic tire, and a further object of the invention being to so protect the pneumatic portion of the tire that it will not be destroyed by the cutting of the tread portion. The tire is also so arranged that if the pneumatic portion becomes inoperative the tread or cushion portion will still render the machine serviceable.

Figure 1:
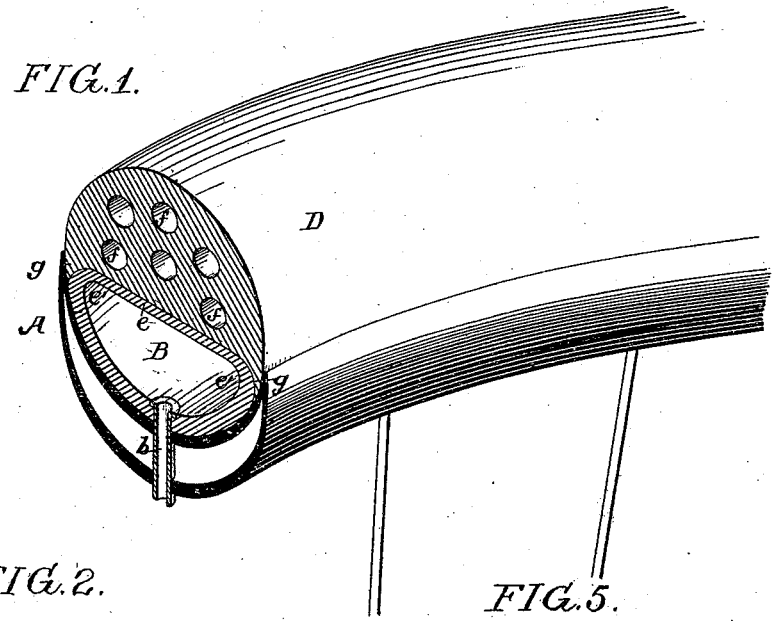
Figure 2:
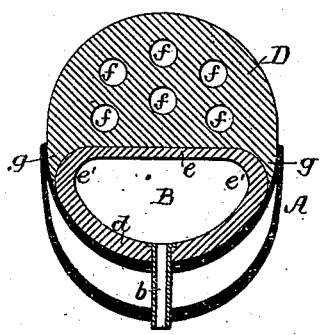
Figure 5:
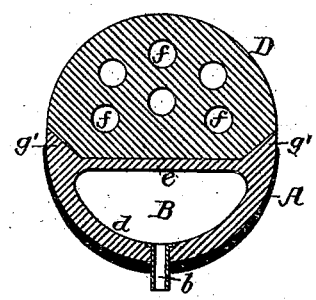
Figure 3:
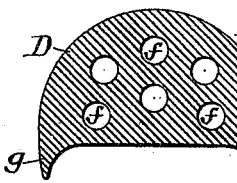
Figure 6:
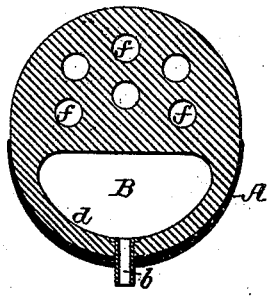
Figure 4:
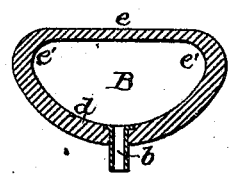

In the accompanying drawings:—Figure 1, is a sectional perspective view of sufficient of my improved tire and its felly to illustrate my invention. Fig. 2, is a transverse sectional view of the same. Fig. 3, is a detached sectional view of the cushion portion of the tire. Fig. 4, is a detached sectional view of the pneumatic portion of the tire. Fig. 5, represents a slightly modified construction of the tire shown in Fig. 2; and Fig. 6, is a view showing the two sections molded in a single piece.

My invention is especially applicable to tires for bicycles and similar machines, but can be used for vehicle wheels of any character.

While a bicycle provided with a pneumatic tire rides easier than either a cushioned or a solid tire, yet there are disadvantages in the use of an inflated tire owing to the fact that if once penetrated by a stone or other sharp object it will at once become useless, and while a cushioned tire is more preferable than a solid tire, it does not yield as readily as a pneumatic tire, but has the advantage, that if it happens to be punctured at any time, the puncture will not destroy it. I so construct my tire as to combine the yielding and cushioning advantages of the pneumatic with the lasting qualities of the cushioned tire, and so mount the cushion section in respect to the pneumatic section that the cushion section will protect the pneumatic section, preventing stones or other sharp objects from destroying the efficiency of the pneumatic section.

Referring to the drawings, A is the felly of the wheel, made in any suitable manner.

B is the pneumatic section preferably semicircular in cross section and provided with an inflating tube *b*. The portion *d* of the pneumatic tire B is preferably secured within the felly of the wheel, as shown, and on the portion *e* rests the cushion section D of the tire. The tread or cushion section is preferably also semicircular in cross section and is provided in the present instance with a series of longitudinal passages *f* so that the tire will more readily yield and accommodate itself to the road. By preference I extend the edges of the felly up to or beyond the surface *e* of the inflated section B in order to protect said inflated section, and I also round the corners *e'* of the inflated section and form on the cushion section B flanges *g g* which extend between the sides of the felly of the wheel, and the portions *e'* of the inflated section so as to add strength to the tire at this point. I do not, however, limit myself to this construction as the inflated section may have flanges *g'* extending over the cushion section, as shown in Fig. 5. In some instances I make the tire as shown in Fig. 6, molding the tread or cushion section with the inflated section, but the principal objection to this form is that if the cushion section wears from contact with the surface of the ground, the whole tire has to be replaced whereas, by having it made in two sections, only the wearing surface, or in other words, the tread or cushion section will have to be replaced, and I also am enabled to make one style of cushion tire to fit any style of inflated tire whether made with one or more longitudinal passages, or made solid, the character of the tread or cushion tire depending altogether upon the selection of the rider.

I claim as my invention—

1. The combination in a tire for cycle and other wheels, of a single inflated tube situated wholly within the felly of the wheel, and a tread portion situated upon said inflated tube and extending partly within and partly beyond the edges of the felly, substantially as specified.

2. The combination in a tire for cycle and other wheels, of an inflated tube situated wholly within the felly of the wheel and having a substantially flat outer surface and a tread portion supported on said flat surface and extending beyond the felly, substantially as described.

3. The combination in a tire for cycle and other wheels, of the two independent sections, one section being inflatable and situated wholly within the felly of the wheel and having a substantially flat outer surface, and the other section having its main portion beyond the felly and so arranged with respect to the inflatable section that the said inflatable section will act as a cushion, substantially as specified.

4. The combination in a tire for cycle and other wheels, of an inflated section situated wholly within the felly and being substantially semi-circular in form, with a second section also substantially semi-circular in form and mounted upon the inflatable section and extending beyond the felly of the wheel, substantially as specified.

5. The combination in a tire for cycle and other wheels, of an inflated section situated within the felly of the wheel, and a cushion section mounted upon the inflated section and extending the full width of the tire so as to protect the inflated section, substantially as set forth.

6. The combination of the felly, the pneumatic section B the cushion section D mounted beyond the pneumatic section, and having flanges at each side adapted to fit between the pneumatic section and the felly, substantially as described.

In testimony whereof I have signed my name to this specification in the presence of two subscribing witnesses.

CHARLES W. VAN HOUTEN.

Witnesses:
H. F. REARDON,
HENRY HOWSON.